US009673868B2

(12) United States Patent
Curtis (10) Patent No.: US 9,673,868 B2
(45) Date of Patent: Jun. 6, 2017

(54) WIRELESS DOOR LOCK POWER TRANSFER SYSTEM HAVING COMMUNICATIONS CAPABILITIES

(71) Applicant: Microchip Technology Incorporated, Chandler, AZ (US)

(72) Inventor: Keith Curtis, Gilbert, AZ (US)

(73) Assignee: MICROCHIP TECHNOLOGY INCORPORATED, Chandler, AZ (US)

( * ) Notice: Subject to any disclaimer, the term of this patent is extended or adjusted under 35 U.S.C. 154(b) by 415 days.

(21) Appl. No.: 14/278,420

(22) Filed: May 15, 2014

(65) Prior Publication Data

US 2014/0340032 A1 Nov. 20, 2014

Related U.S. Application Data

(60) Provisional application No. 61/824,248, filed on May 16, 2013.

(51) Int. Cl.
*H02J 7/00* (2006.01)
*H04B 5/00* (2006.01)
(Continued)

(52) U.S. Cl.
CPC ....... *H04B 5/0037* (2013.01); *E05B 47/0001* (2013.01); *G07C 9/00174* (2013.01);
(Continued)

(58) Field of Classification Search
CPC ......... E05B 2047/0061; E05B 47/0001; G07C 9/00174; G07C 9/00309; G07C 9/00944;
(Continued)

(56) References Cited

U.S. PATENT DOCUMENTS

| 6,259,352 B1 * | 7/2001 | Yulkowski | E05B 47/00 340/5.7 |
| 6,381,999 B1 * | 5/2002 | Doong | E05B 47/0012 292/144 |

(Continued)

FOREIGN PATENT DOCUMENTS

| CN | 2481805 Y | 3/2002 |
| CN | 101542059 A | 9/2009 |

(Continued)

OTHER PUBLICATIONS

International Search Report and Written Opinion, Application No. PCT/US2014/038367, 15 pages, Aug. 29, 2014.
(Continued)

*Primary Examiner* — Nathaniel Pelton
(74) *Attorney, Agent, or Firm* — Slayden Grubert Beard PLLC (57) ABSTRACT

A door frame has a first electromagnetic coil and a door lock has a second electromagnetic coil with a door bolt electromagnetically coupling together the first and second electromagnetic coils, thereby forming a transformer. Power is transferred from the door frame to door lock through the transformer. Communications from the door frame to the door lock may be provided by modulating electromagnetic energy to the first electromagnetic coil and demodulating the modulated electromagnetic energy received at the second electromagnetic coil. Communications from the door lock to the door frame may be provided by varying a load on the second electromagnetic coil and detecting the load change at the first electromagnetic coil.

29 Claims, 4 Drawing Sheets

(51) Int. Cl.
*H01F 38/14* (2006.01)
*H02J 5/00* (2016.01)
*H02J 17/00* (2006.01)
*H02J 7/02* (2016.01)
*G07C 9/00* (2006.01)
*E05B 47/00* (2006.01)

(52) U.S. Cl.
CPC ..... *G07C 9/00309* (2013.01); *G07C 9/00944* (2013.01); *H01F 38/14* (2013.01); *H02J 5/005* (2013.01); *H02J 7/025* (2013.01); *H02J 17/00* (2013.01); *E05B 2047/0061* (2013.01); *G07C 2009/00634* (2013.01); *G07C 2009/00777* (2013.01); *G07C 2009/00809* (2013.01); *H01F 2038/146* (2013.01)

(58) Field of Classification Search
CPC ........... G07C 2009/00634; G07C 2009/00777; G07C 2009/00809; H02J 17/00; H02J 50/00; H02J 50/10; H02J 5/005; H02J 7/025; H04B 5/0037; H01F 2038/146; H01F 38/14
USPC ....................................................... 320/108
See application file for complete search history.

(56) References Cited

U.S. PATENT DOCUMENTS

| | | | | |
|---|---|---|---|---|
| 8,772,970 | B2 | 7/2014 | Lambrou | 307/104 |
| 2004/0183652 | A1* | 9/2004 | Deng | G07C 9/00563 340/5.53 |
| 2006/0164206 | A1* | 7/2006 | Buckingham | E05B 47/00 340/5.6 |
| 2010/0236306 | A1* | 9/2010 | Trempala | E05B 47/063 70/263 |
| 2012/0140456 | A1* | 6/2012 | Battis | F41A 33/02 362/183 |
| 2012/0267962 | A1* | 10/2012 | Hanchett, Jr. | E05B 17/22 307/104 |
| 2014/0354399 | A1* | 12/2014 | Allen | G08B 13/22 340/5.3 |

FOREIGN PATENT DOCUMENTS

| | | | | |
|---|---|---|---|---|
| DE | 20100138 U1 | 3/2001 | ............ | E05B 47/00 |
| FR | 2677396 A1 | 12/1992 | | |
| JP | 646479 A | 1/1989 | | |
| WO | 02/077399 A1 | 10/2002 | | |

OTHER PUBLICATIONS

"MCP2030: Three-Channel Analog Front-End Device," Microchip Technology Incorporated, 66 pages, Aug. 24, 2005.
"MCP2036: Inductive Sensor Analog Front End Device," Microchip Technology Incorporated, 30 pages, Mar. 26, 2009.
Pop, Cristian, "AN1391: Introduction to the BodyCom Technology," Microchip Technology Incorporated, 26 pages, May 2, 2011.
"MTCH810: Haptics Controller," Microchip Technology Incorporated, 30 pages, Nov. 29, 2012.
Chinese Office Action, Application No. 201480031442.0, 13 pages.

* cited by examiner

WIRELESS DOOR LOCK POWER TRANSFER SYSTEM HAVING COMMUNICATIONS CAPABILITIES

RELATED PATENT APPLICATION

This application claims priority to commonly owned U.S. Provisional Patent Application No. 61/824,248 filed May 16, 2013, is hereby incorporated by reference herein for all purposes.

TECHNICAL FIELD

The present disclosure relates to door lock systems, and, in particular, to a wireless door lock power transfer system having communications capabilities therewith.

BACKGROUND

Recent trends are increasing the intelligence of door locks through electronic means. Most vendors use battery power for the electronics associated with these intelligent door locks. However, this application has problems with battery life. Alternative door lock powering systems use armored cable to supply power to the door lock electronics. This solution requires custom, complicated and expensive modifications to the door.

SUMMARY

Therefore a need exists for an improved door lock power transfer system, and in particular for a wireless door lock power transfer system having communications capabilities therewith.

According to an embodiment, an apparatus for transferring power wirelessly to a door lock may comprise: a first electric inductor shaped as a coil, adapted to receive a first portion of a door locking bolt and installed in a door frame; a power transmitter having an alternating current (AC) output coupled to the first electric inductor and an input coupled to a first power source; a second electric inductor shaped as a coil that surrounds the door locking bolt and may be installed in a door; and a power receiver having an input coupled to the second electric inductor and an output for providing a second power source.

According to a further embodiment, a power storage device may be coupled to the output of the power receiver. According to a further embodiment, the power storage device may be a rechargeable battery. According to a further embodiment, the power storage device may be a super capacitor. According to a further embodiment, a door frame transceiver and a door transceiver may be provided for communicating between the door frame and the door.

According to a further embodiment, wherein: the door frame transceiver may be coupled to the power transmitter and modulates the AC output thereof for reception by the door transceiver through the second inductor; and the door transceiver may be coupled to the power receiver, wherein the power receiver modulates a load on the second inductor that may be detected by the door frame transceiver through the first inductor. According to a further embodiment, the door frame and door transceivers communicate with at least one wireless signal conveying data therebetween. According to a further embodiment, the wireless signal may be selected from the group consisting of Bluetooth®, Wi-Fi®, Zig-Bee®, IRDA, InfraRed, and Ultrasonic. According to a further embodiment, the wireless signal may be formatted in accordance with at least one communications standard selected from the group consisting of Bluetooth®, Wi-Fi®, and Zigbee®.

According to a further embodiment, a door frame digital processor may be coupled to the door frame transceiver and the power transmitter, and a door digital processor may be coupled to the door transceiver and the power receiver. According to a further embodiment, the bolt may be selected from the group consisting of a magnetic metal, a plurality of magnetic metal plates insulated from one another, ferrite impregnated epoxy molded into a door bolt shape. According to a further embodiment, the bolt may be a quartz crystal core surrounded by a metal sleeve that resonantly couples power from the first electric inductor to the second electric conductor. According to a further embodiment, power may be transferred through capacitive coupling between the door frame and the door. According to a further embodiment, power may be transferred from the first electric inductor to the second electric conductor acting as an air core transformer.

According to a further embodiment, a coded unlocking device may be coupled to the door digital processor. According to a further embodiment, the coded unlocking device may be a key card and key card reader in the door. According to a further embodiment, the coded unlocking device may be a BodyCom™ receiver coupled to a handle or knob of the door and adapted to receive a BodyCom™ signal when the handle or knob is touched by a person with a BodyCom™ transmitter having a corresponding access code for the door lock. According to a further embodiment, heat sensors may be on each side of the door, wherein the heat sensors may be coupled to the door digital processor and provide surface temperatures of each side of the door.

According to a further embodiment, the door digital processor may cause a door handle or knob to vibrate if the surface temperature on the opposite side of the door may be above a certain temperature. According to a further embodiment, a door handle or knob position sensor may be coupled to the door digital processor for indicating positions of the door handle or knob. According to a further embodiment, the door unlocks to open and then relocks upon closing when the door handle or knob is rotated in a first direction, and the door unlocks to open and remains unlocked upon closing when the door handle or knob is rotated in a second direction. According to a further embodiment, the door unlocks when the door handle or knob is rotated in a correct sequential combination of positions and directions. According to a further embodiment, the door frame and door digital processors may be microcontrollers.

According to another embodiment, a wireless door lock power transfer system may comprise: a first circuit arranged within a door frame and that may comprise: a first coil, a power driver coupled with the first coil operable to transmit power and to transmit and receive data via said first coil, and a first microcontroller coupled with said power driver; and a second circuit arranged within a door and that may comprise: a bolt operable to engage with said door frame and further operable to be received within said first coil when engaging with said door frame, a second coil surrounding said bolt on a door side, a receiving unit coupled with said second coil operable to receive power and to receive and transmit data via said second coil, and a second microcontroller coupled with said receiving unit, wherein the receiving unit provides a supply voltage to said second microcontroller when said second coil receives a carrier signal transmitted by said first coil via said bolt.

According to a further embodiment, the second circuit may comprise a high power voltage supply system controlled by said second microcontroller for providing a high power supply voltage. According to a further embodiment, the second circuit further comprises a driving unit operable to move said bolt into and output of said door frame for locking and unlocking said door, wherein the driving unit may be coupled with said high power supply voltage system. According to a further embodiment, a plurality of bolts may be provided at a plurality of locations around said door proximate to said door frame and operable to move said plurality of bolts. According to a further embodiment, the high power voltage supply system may be a switched mode power supply controlled by said second microcontroller. According to a further embodiment, the receiving unit modulates loading of said second coil for transmitting data from said second circuit to said first circuit. According to a further embodiment, the power driver may modulate the transmitted power to said first coil for transmitting data from said first circuit to said second circuit.

According to yet another embodiment, a method for transferring power wirelessly to a door lock may comprise the step of: transmitting electromagnetic energy from a power transmitter proximate to a door frame through, a door bolt to a power receiver in a door, the power transmitter may be coupled to a first electromagnetic coil surrounding a first portion of the door bolt and the power receiver may be coupled to a second electromagnetic coil surrounding a second portion of the door bolt.

According to a further embodiment of the method, the step of communicating between the door frame and door may comprise the step of communicating through the power transmitter and the power receiver. According to a further embodiment of the method, the step of communicating through the power transmitter and the power receiver may comprise the steps of: modulating the electromagnetic energy with the power transmitter; demodulating the electromagnetic energy with the power receiver; varying a load coupled to the second electromagnetic coil with the power receiver; and detecting variations of the load coupled between the second and first electromagnetic coils with the power transmitter.

BRIEF DESCRIPTION OF THE DRAWINGS

A more complete understanding of the present disclosure may be acquired by referring to the following description taken in conjunction with the accompanying drawings wherein.

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims.

DETAILED DESCRIPTION

According to various embodiments, powering and communicating to door locking mechanisms without the reliability and expense issues associated with batteries or hard wiring can be provided. According to various embodiments, a power transfer system is proposed that uses the lock bolt as the core of a transformer having a first electrical inductive coil winding in the door frame and over a first portion of the lock bolt, and a second electrical inductive coil winding in the door and over a second portion of the lock bolt. This transformer couples power from a door frame power source to the lock apparatus, and also may have the capability to be used for communications between the door lock apparatus and the associated door frame apparatus.

Thus, no issues with dead batteries can occur. No expensive armored cables are need. No custom door modifications are necessary. The power transfer system, according to the teachings of this disclosure, may be capable of coupling higher power and bidirectional data, and, addition, has the potential to transmit sufficient power for electro-mechanically mechanical elements of a door locking assembly, e.g., door bolt, door latch, locking tumblers, etc.

Referring now to the drawings, the details of example embodiments are schematically illustrated. Like elements in the drawings will be represented by like numbers, and similar elements will be represented by like numbers with a different lower case letter suffix.

Figure 1:
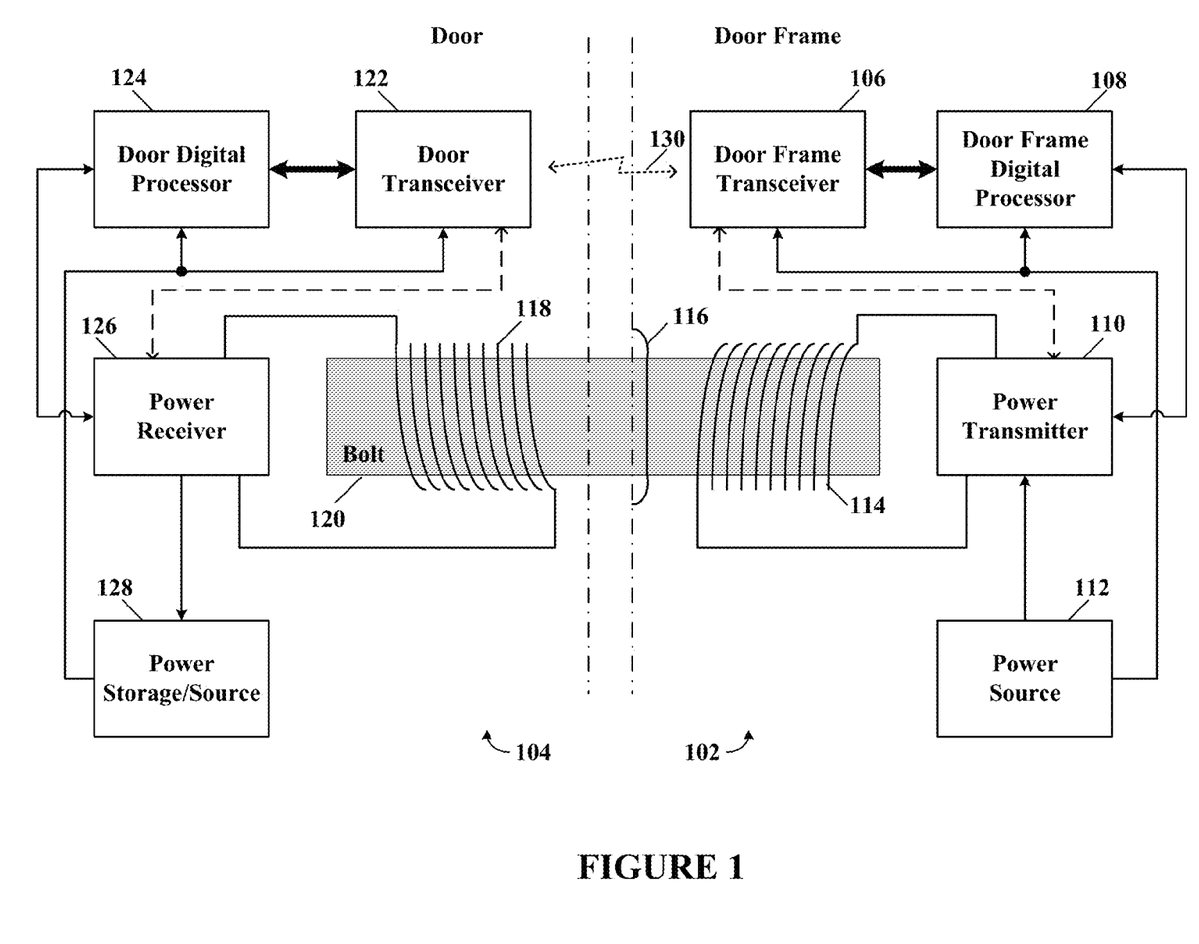
FIG. 1 illustrates a schematic block diagram of a door lock power transfer system having communications capabilities therewith, according to a specific example embodiment of this disclosure.

Referring to FIG. 1, depicted is a schematic block diagram of a door lock power transfer system having communications capabilities therewith, according to a specific example embodiment of this disclosure. The power transfer system having communications capabilities therewith may be divided into two parts: (1) lock bolt receiving, e.g., striker plate 116; power generation and communications apparatus in the door frame 102; and (2) a locking apparatus comprising power receiving and storage, communications, a lock bolt and lock bolt control in the door 104. In the door frame 102, a first power circuit may comprise an inductive driver power transmitter 110 coupled to a first inductive coil 114 that surrounds a first portion of a movable lock bolt 120 from the door 104. The inductive driver power transmitter 110 and first inductive coil 114 generate an alternating current (AC) magnetic field in the lock bolt 120.

In the locking apparatus within the door 104 a second power circuit may comprise a second inductive coil 118 surrounding a second portion of the movable lock bolt 120. The lock bolt 120 functions as the core of a transformer, thereby efficiently transferring magnetic flux between the first and second inductive coils 114 and 118. This magnetic flux transfer causes the second inductive coil 118 to generate an alternating current (AC) voltage that may be converted to a direct current (DC) voltage in the power receiver 126. This converted (rectified) DC voltage may be stored in a power storage/source device 128, e.g., battery or super capacitor, and/or used directly to power high energy requirement components of the door lock, e.g., electro-mechanical actuation of the lock bolt 120 opening and/or closing. The power storage/source device 128 may power a door digital processor 124 and a door communications transceiver 122.

The door frame and door communications transceivers 106 and 122 may be coupled to and communicate through their respective first and second inductive coils 114 and 118. These communications couplings may be direct to the respective inductive coils but preferably may be through the power transmitter 110 and power receiver 126 by modulating the magnetic flux, e.g., changing the amplitude, phase and/or frequency of the AC voltage from the power transmitter 110 and altering the magnetic flux field by changing the load (impedance) of the second inductive coil 118 with the power receiver 126. Thus, two way communications may be established between the door frame 102 and the door 104. Alternately or in addition to the magnetic flux induced communications through the bolt 120, a wireless signal(s) 130 may be used directly between the door and door frame transceivers 122 and 106, e.g., Bluetooth® a registered trademark owned by the Bluetooth® SIG, Wi-Fi® a registered trademark owned by the Wi-Fi Alliance, ZigBee® a registered trademark owned by the ZigBee Alliance, IRDA, InfraRed, Ultrasonic; or any other radio frequency, optic or audio based communications system. Wireless signal(s) 130 may be advantageously used when the door 104 is open and the bolt 120 is not in or proximate to the first inductive coil 114. The same wireless signal 130 or other wireless signal(s) may be used in a communications network to send and receive data between a plurality of doors 104/door frames 102 and a central control computer (not shown) for control and monitoring of each door 104 and/or door frame 102. Central monitoring control may comprise, but is not limited to, remotely changing security entry codes, locking and unlocking doors 104 by remotely controlling a bolt locking mechanism (not shown) or electro-mechanically moving the bolt 120 in or out of the door frame 102 striker plate 116. The communications network may be, for example but is not limited to, Wi-Fi®, ZigBee®, IOT (Internet of things), node-to-node communications, or networked communications system having a standard or custom protocol. Monitoring may comprise, but is not limited to, bolt position (door locked or unlocked), door open or closed, temperatures of each side of door (fire monitoring conditions), security camera imbedded in outside (hall facing) surface of door 104.

A door digital processor 124 may be used to control functions of locking and bolt actuation, data communications via the door transceiver 122, and security code storage and comparison to a security entry device, e.g., magnetic card, wireless key fob, voice recognition, fingerprint recognition, facial recognition, iris scan, keypad entry code, RFID security badge, BodyCom™ (a pending trademark application owned by Microchip Technologies Incorporated), transmitted encrypted entry code, palm scanner, magnetic key, combination lock using unique door position combinations, or 2D bar code on ID badge. Not shown is a key card reader or key pad that may be coupled to the door digital processor 124 and used to unlock the bolt 120 and gain access to a room behind the door 104 when the key card security code matches the security code stored in the door digital processor 124. It is within the scope of this disclosure that other forms of security access are contemplated as more fully described hereinafter. The bolt 120 may be unlocked with deactivation (withdrawal) of a locking pin (not shown) and the bolt mechanically moved to a retracted position within the door 104 by a door handle or knob (not shown), or electro-mechanically moved from an extended position in the door frame 102/striker 116 to a retracted position within the door 104. A door frame digital processor 108 may be used to control functions of a door frame transceiver 106 and power transmitter 110. The power source 112 may be from a local 120 VAC branch circuit (not shown), e.g., through a power transformer (not shown) connected to a room outlet and coupled to a power jack (not shown) in the door frame 102. The door and/or door frame digital processors 124 and/or 108 may be part of respective microcontrollers in the lock of the door 104 and door frame 102. The door bolt 120 may comprise, for example but is not limited to, solid metal having magnetic properties, laminated and insulated strips of magnetic metals such as used in power transformers, a solid ferrite rod of magnetic material that may be easily molded, e.g., ferrite particles in an epoxy resin base. Power transfer may also be provided through capacitive coupling through high permittivity material, resonantly coupled through a quartz crystal core surrounded by a metal sleeve, and/or open air coupled e.g., air core transformer like keycards.

Figure 2:
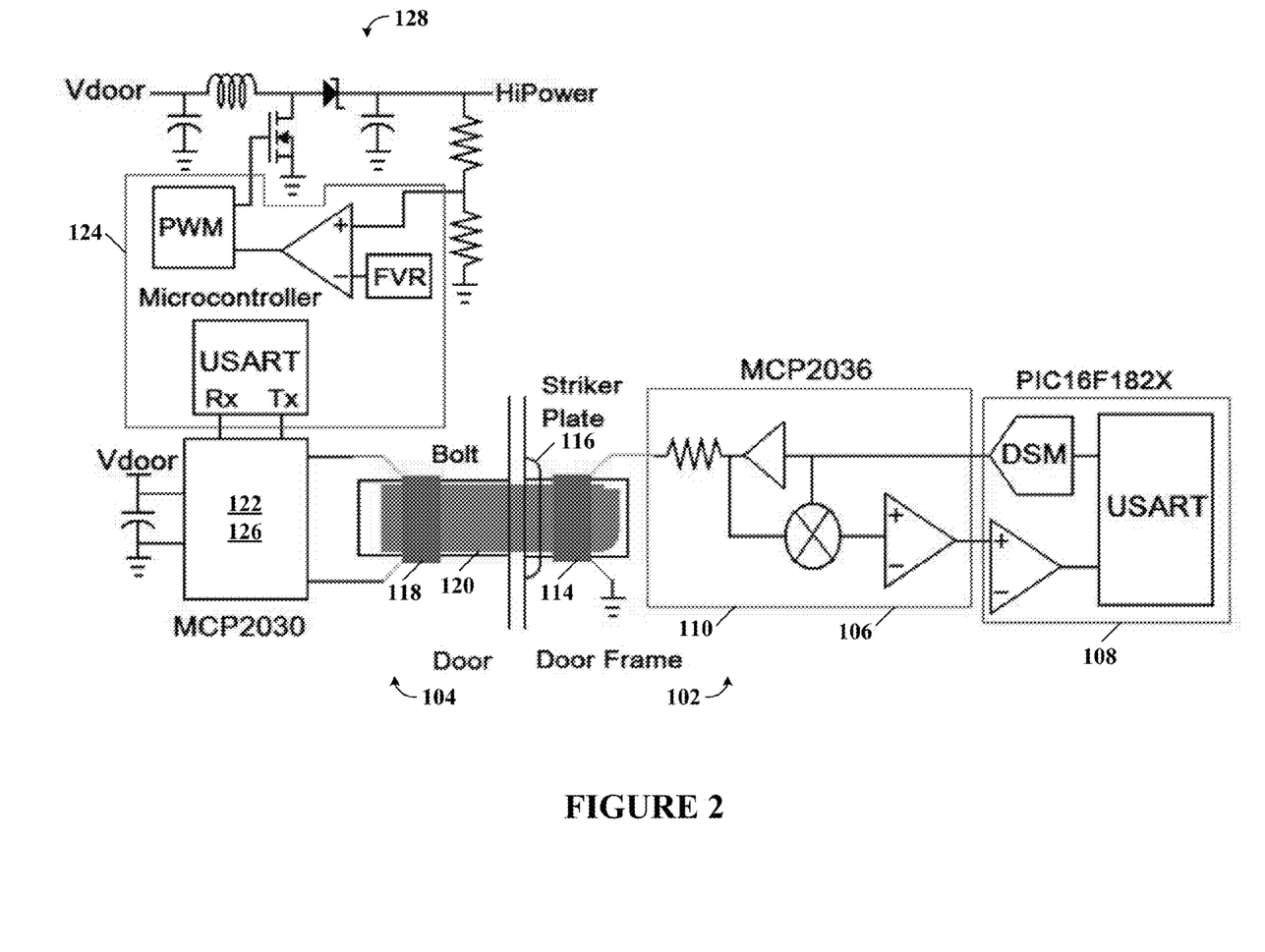
FIG. 2 illustrates a more detailed schematic block diagram of a door lock power transfer system having communications capabilities therewith, according to a specific example embodiment of this disclosure.

Referring to FIG. 2, depicted is a more detailed schematic block diagram of a door lock power transfer system having communications capabilities therewith, according to a specific example embodiment of this disclosure. In the door frame 102, an Inductive Sensor Analog Front End Device model MCP2036, manufactured by Applicant, may provide the power transmitter 110 and door frame communications transceiver 106 functions as shown in FIG. 1. A microcontroller model PIC16F182X, manufactured by Applicant, may provide the door frame digital processor 108 functions as shown in FIG. 1. In the door 104, a Three-Channel Analog Front-End Device model MCP2030, manufactured by Applicant, may provide the power receiver 126 and door communications transceiver 122 functions as shown in FIG. 1. Any microcontroller having a USART and pulse width modulation control capabilities may provide the door digital processor 124 functions as shown in FIG. 1. A switch mode power supply 128 may be used to provide higher voltage/power for operation of an electro-mechanical actuator for movement of the door bolt 120. Data sheets and Applications Notes for the aforementioned devices are available at www.microchip.com, and are hereby incorporated by reference herein for all purposes.

The MCP2036 (106, 110) coupled to and in combination with the first inductive coil 114 may be used to generate an AC magnetic field in the bolt 120 of the lock. In the lock within the door 104, the integrated analog front end device MCP2030 (122, 126) receives an AC voltage from the second inductive coil 118 and converts this AC voltage to a DC voltage.

The MCP2036 (106, 110) has a clock that may be driven by a data signal modulator (DSM) in the associated microcontroller 108. The DSM can modulate the AC magnetic field allowing the transmission of data to the lock electronics within the door, where it may be decoded, for example, by the analog front end device MCP2030 (122, 126).

Data can also be passed from the lock electronics within the door to the frame electronics, for example, by the analog front end device MCP2030 (122, 126) that may modulate the load of the second inductive coil 118 of the transformer formed by the first and second inductive coils 114 and 118, and the bolt 120. Wherein the MCP2036 (106, 110) detects the change in load as a change in the impedance of the secondary of the transformer and then passes this to a comparator for conversion to a digital level that may be decoded by a USART in the microcontroller 108.

It should be noted that the impedance detection within the MCP2036 also may provide an indication of whether the bolt 120 is present in the first inductive coil 114 and hence if the door is closed and locked. A lower inductive impedance detection may show that the door is closed but not locked where the bolt 120 is proximate to but not in the first inductive coil 114. Detection of the lowest impedance would indicate that the door is open and the bolt 120 is not proximate to the first inductive coil 114.

According to some embodiments, other modulation schemes may be used. For example, the first circuit in the door lock may use a carrier frequency different from the carrier frequency of the second circuit in the frame and modulate it with frequency or amplitude modulation. Other modulation techniques may be used and are contemplated herein for all purposes.

The MCP2036 was originally designed for use with inductive touch systems, and while the MCP2030 was designed for passing data in this form, it was designed for communicating with passive very low-power identity cards. The use of the bolt 120 as a magnetic core allows however the transfer of much higher power levels as well as providing an indication of the door closure/locked or unlocked, and door open.

The system part arranged within the door may comprise a microcontroller 124 having an asynchronous transceiver, a pulse width modulation (PWM) unit, a voltage comparator and a reference voltage source as shown in FIG. 2. The comparator, voltage reference and pulse width modulator are used to generate an internal high power supply voltage using switched mode power supply techniques. The high power voltage may be used directly to operate the bolt 120, for example by a motor, a servo or solenoid magnet.

The basic supply voltage Vdoor may be generated by the MCP2030 which is operable to convert a carrier frequency received from the coil 118 arranged around the bolt 120 into a supply voltage. The carrier frequency is furthermore modulated to transmit data from the door frame 102 to the door system parts as shown. Furthermore, the MCP2030 is operable to modulate the received carrier frequency, for example by modulating a load applied to the receiving inductive coil 118. Thus, the transmitter side in the door frame 102 can detect the loading thereof and convert it into a data stream for receiving data from the door 104.

The door frame side also comprises a microcontroller 108, here, for example but not limited to, a microcontroller from the PIC16F182X family manufactured by Applicant. The MCP2036 which is generally designed for an inductive proximity detection system may be used as an driver circuit for transmitting power and data as shown. The microcontroller used in this embodiment thus only requires a digital signal modulator and a comparator which may be coupled with an asynchronous peripheral in the transceiver 106.

Figure 3:
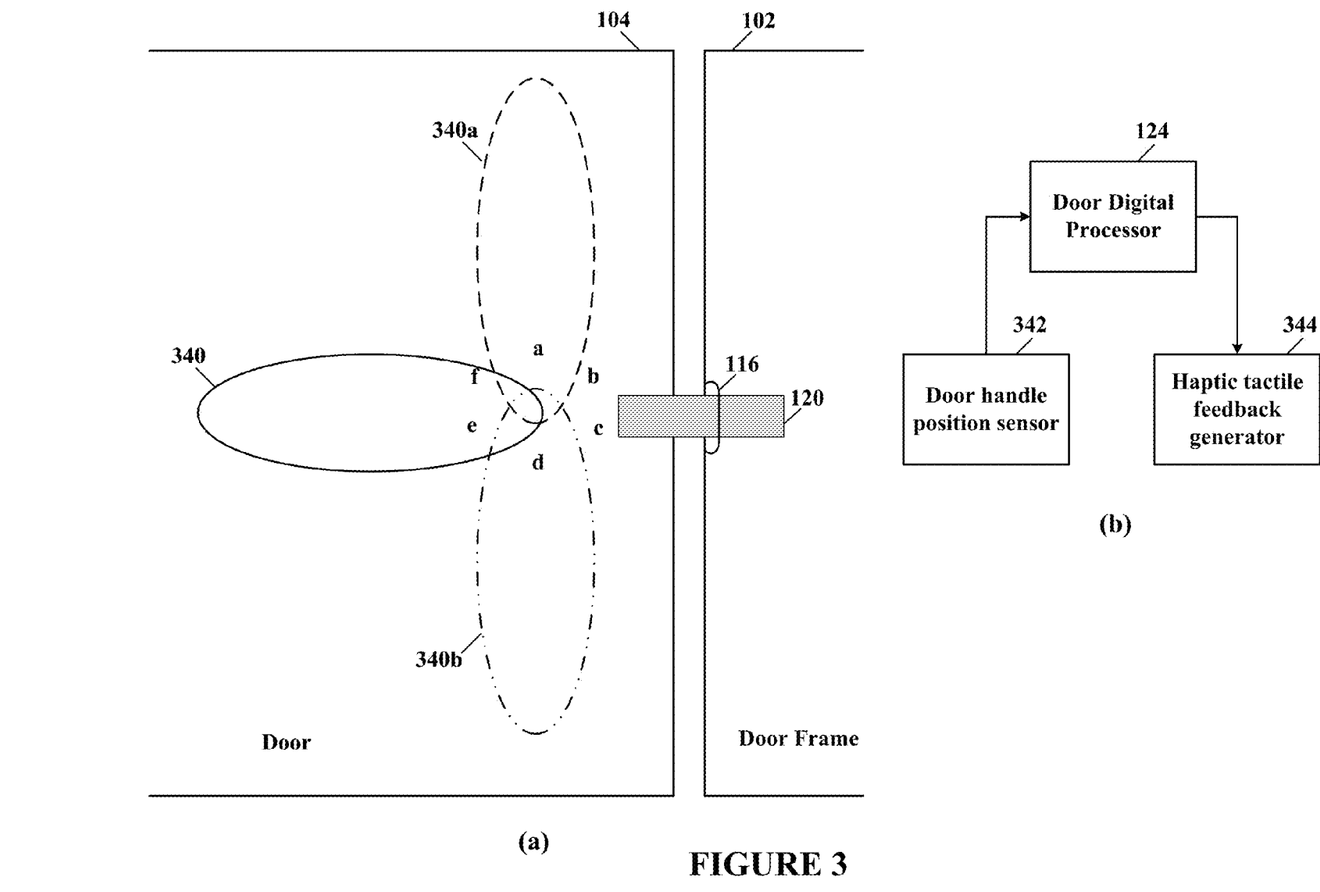
FIG. 3 illustrates a schematic diagram of a capable haptic door lever/knob at several different positions, according to another specific example embodiment of this disclosure.

Referring to FIG. 3, depicted is a schematic diagram of a haptic capable door lever/knob at several different positions, according to another specific example embodiment of this disclosure. As shown in FIG. 3(*a*), a door handle 340 or knob (not shown) may be adapted to be positioned in a plurality of rotational orientations. For example, the position of the door handle 340 may signify a door locked condition with the bolt 120 extended into the door frame 102 and striker plate 116. The position of the door handle 340*a* may signify a door open condition with the bolt 120 retracted from the door frame 102 and striker plate 116, wherein when the door 120 is closed but the bolt 120 remains in the retracted unlocked condition. The position of the door handle 340*b* may signify a door open condition with the bolt 120 retracted from the door frame 102 and striker plate 116, wherein when the door 120 is closed the bolt 120 returns back to the extended locked condition. It is contemplated and within the scope of this disclosure that many other door handle 340 positions may be programmed such as an emergency alert if the handle 340 is moved to the door handle 340*a* position and then to the door handle 340*b* position. Key-less and card-less unlocking of the door may also be accomplished by unique position combinations of the door handle 340, similar to a combination safe lock. Numbers and/or letters may be placed on the door around the circumference of the shaft of the door handle 340, e.g., as shown in FIG. 3(*a*), for improved granularity of handle position locations to increase the number and complexity of the entry codes available. For example, move door handle 340 clockwise to position a, then counterclockwise to position e, then clockwise to position b, then counterclockwise to position d, etc.

Referring to FIG. 3(*b*), a handle position sensor 342 may be coupled to the door digital processor 124 to provide positions of the handle 340 thereto. A haptic tactile feedback generator 344 may be coupled to the handle 340, wherein various turning resistances may be provided, e.g., to indicate locked or unlocked bolt position; and/or the door handle 340 can be made to vibrate when being rotated if there is danger on the other side of the door, e.g., fire in the room or hallway. Haptic technology or "Haptics" provides tactile feedback to the user by applying forces or vibrations. Microchip's MTCH810 is an integrated controller which allows engineers to easily add haptic features to door lock applications. More detailed information on haptics may be found at www.microchip.com and a typical Haptic Controller model MTCH810, manufactured by Applicant, may be used for such purposes. Haptic technology and the Haptic Controller model MTCH810 data sheets are incorporated by reference herein for all purposes.

Figure 4:
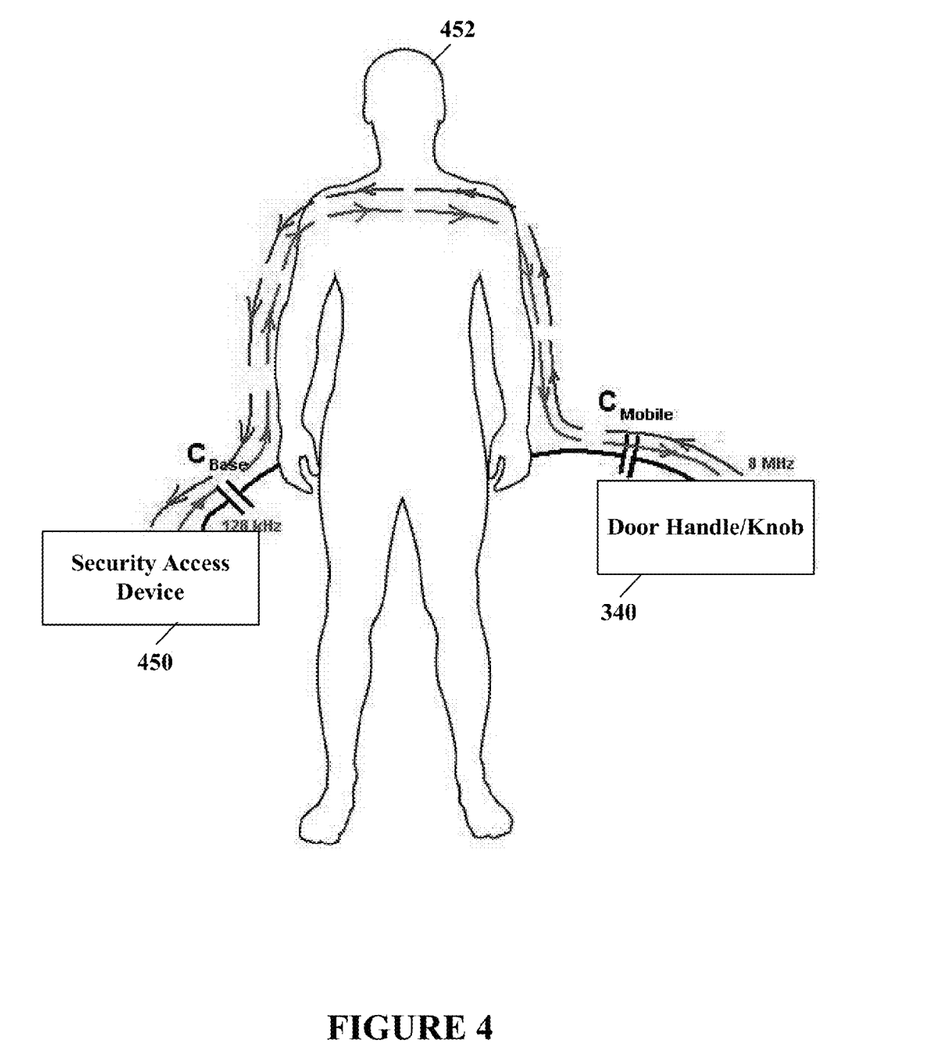
FIG. 4 illustrates a schematic diagram of a BodyCom™ activated security door entry system, according to still another specific example embodiment of this disclosure.

Referring to FIG. 4, depicted is a schematic diagram of a BodyCom™ activated security door entry system, according to still another specific example embodiment of this disclosure. The BodyCom™ system is a new short-range wireless connectivity technology that uses the capability of the human body to transport a few signals that provide intuitive, simple, and safe communication between two electronically compatible devices. Communication between BodyCom™ system devices occurs when they are within a few centimeters of the human body: a simple proximity or touch detection can establish a BodyCom™ system connection. More detailed information on the BodyCom™ technology is provided in Microchip Application Note AN1391 available at www.microchip.com, and is incorporated by reference herein for all purposes.

A person 452 may wear a BodyCom™ security access device 450 on his or her person, e.g., wristband, waste band, ankle band, security card in wallet, necklace, secured and hidden device on person for sensitive high security situations, e.g., prisons and mental hospitals. The door lock may be configured with a BodyCom™ receiver such that when the door handle (knob) 340 is grasped by an authorized person having a properly coded BodyCom™ security access device 450, the door will unlock and provide him or her access through the unlocked door. Without the BodyCom™ security access device 450 having proper access coding, unlocking of the door will be denied. Special access options may also be provided for police and firemen to gain access quickly through a door so equipped when they have the correct BodyCom™ security access device 450.

It is contemplated and with the scope of this disclosure that a plurality of electro-mechanically operated bolts 120 may be integrated into the door 104 with corresponding striker plates 116 and first inductive coils 114 for bolt position sensing. This type of door locking system gives added security and protection from invasion to high security areas, e.g., airplane cockpit, safe rooms, school room access, etc. It is also contemplated and with the scope of this disclosure that the door lock mechanism may be remotely set to either an unlocked or locked condition during situations that warrant such actions, e.g., unlock all doors during a fire alert, lock all doors during a prison riot, etc.

In summary, the proposed solution solves the power problem, provides secure communications, provides for door lock position detection, and adds new levels of security and access to electronically operated door locks.

While embodiments of this disclosure have been depicted, described, and are defined by reference to example embodiments of the disclosure, such references do not imply a limitation on the disclosure, and no such limitation is to be inferred. The subject matter disclosed is capable of considerable modification, alteration, and equivalents in form and function, as will occur to those ordinarily skilled in the pertinent art and having the benefit of this disclosure. The depicted and described embodiments of this disclosure are examples only, and are not exhaustive of the scope of the disclosure.

What is claimed is:

1. An apparatus for transferring power wirelessly to a door lock, comprising:
    a first electric inductor shaped as a coil, adapted to receive a first portion of a door locking bolt and installed in a door frame;
    a power transmitter having an alternating current (AC) output coupled to the first electric inductor and an input coupled to a first power source;
    a second electric inductor shaped as a coil that surrounds the door locking bolt and is installed in a door;
    a power receiver having an input coupled to the second electric inductor and an output for providing a second power source; and
    a door frame transceiver and a door transceiver for communicating between the door frame and the door, wherein:
        the door frame transceiver is coupled to the power transmitter and modulates the AC output thereof for reception by the door transceiver through the second inductor; and
        the door transceiver is coupled to the power receiver, wherein the power receiver modulates a load on the second inductor that is detected by the door frame transceiver through the first inductor.

2. The apparatus according to claim 1, further comprising a power storage device coupled to the output of the power receiver.

3. The apparatus according to claim 2, wherein the power storage device is a rechargeable battery.

4. The apparatus according to claim 2, wherein the power storage device is a super capacitor.

5. The apparatus according to claim 1, wherein the door frame and door transceivers communicate with at least one wireless signal conveying data therebetween.

6. The apparatus according to claim 5, wherein the wireless signal is selected from the group consisting of Bluetooth®, Wi-Fi®, ZigBee®, IRDA, InfraRed, and Ultrasonic.

7. The apparatus according to claim 5, wherein the wireless signal is formatted in accordance with at least one communications standard selected from the group consisting of Bluetooth®, Wi-Fi®, and Zigbee®.

8. The apparatus according to claim 1, further comprising:
    a door frame digital processor coupled to the door frame transceiver and the power transmitter, and
    a door digital processor coupled to the door transceiver and the power receiver.

9. The apparatus according to claim 1, wherein the door locking bolt is selected from the group consisting of a magnetic metal, a plurality of magnetic metal plates insulated from one another, ferrite impregnated epoxy molded into a door bolt shape.

10. The apparatus according to claim 1, wherein the door locking bolt is a quartz crystal core surrounded by a metal sleeve that resonantly couples power from the first electric inductor to the second electric conductor.

11. The apparatus according to claim 1, wherein power is transferred through capacitive coupling between the door frame and the door.

12. The apparatus according to claim 1, wherein power is transferred from the first electric inductor to the second electric conductor acting as an air core transformer.

13. The apparatus according to claim 8, further comprising a coded unlocking device coupled to the door digital processor.

14. The apparatus according to claim 13, wherein the coded unlocking device is a key card and key card reader in the door.

15. The apparatus according to claim 13, wherein the coded unlocking device is a receiver:
    configured to receive signals from a human-based transmitter;
    coupled to a handle or knob of the door; and
    adapted to receive a human-based transmitter signal when the handle or knob is touched by a person with the human-based transmitter having a corresponding access code for the door lock.

16. The apparatus according to claim 8, further comprising heat sensors on each side of the door, wherein the heat sensors are coupled to the door digital processor and provide surface temperatures of each side of the door.

17. The apparatus according to claim 16, wherein the door digital processor causes a door handle or knob to vibrate if the surface temperature on the opposite side of the door is above a certain temperature.

18. The apparatus according to claim 8, further comprising a door handle or knob position sensor coupled to the door digital processor for indicating positions of the door handle or knob.

19. The apparatus according to claim 18, wherein the door unlocks to open and then relocks upon closing when the door handle or knob is rotated in a first direction, and the door unlocks to open and remains unlocked upon closing when the door handle or knob is rotated in a second direction.

20. The apparatus according to claim 18, wherein the door unlocks when the door handle or knob is rotated in a correct sequential combination of positions and directions.

21. The apparatus according to claim 8, wherein the door frame and door digital processors are microcontrollers.

22. A wireless door lock power transfer system, said system comprising:
    a first circuit arranged within a door frame and comprising:
        a first coil,
        a power driver coupled with the first coil operable to transmit power and to transmit and receive data via said first coil, and
        a first microcontroller coupled with said power driver; and a second circuit arranged within a door and comprising:
- a bolt operable to engage with said door frame and further operable to be received within said first coil when engaging with said door frame,
- a second coil surrounding said bolt on a door side,
- a receiving unit coupled with said second coil operable to receive power and to receive and transmit data via said second coil, and
- a second microcontroller coupled with said receiving unit, wherein the receiving unit provides a supply voltage to said second microcontroller when said second coil receives a carrier signal transmitted by said first coil via said bolt.

23. The system according to claim 22, wherein the second circuit further comprises a power voltage supply system controlled by said second microcontroller for providing a power supply voltage.

24. The system according to claim 23, wherein the second circuit further comprises a driving unit operable to move said bolt into and output of said door frame for locking and unlocking said door, wherein the driving unit is coupled with said power supply voltage system.

25. The system according to claim 24, further comprising a plurality of bolts at a plurality of locations around said door proximate to said door frame and operable to move said plurality of bolts.

26. The system according to claim 23, wherein the power voltage supply system is a switched mode power supply controlled by said second microcontroller.

27. The system according to claim 22, wherein the receiving unit modulates loading of said second coil for transmitting data from said second circuit to said first circuit.

28. The system according to claim 22, wherein the power driver modulates the transmitted power to said first coil for transmitting data from said first circuit to said second circuit.

29. A method for transferring power wirelessly to a door lock, said method comprising:
- transmitting electromagnetic energy from a power transmitter proximate to a door frame through a door bolt to a power receiver in a door, wherein the power transmitter is coupled to a first electromagnetic coil surrounding a first portion of the door bolt and the power receiver is coupled to a second electromagnetic coil surrounding a second portion of the door bolt;
- communicating between the door frame and door through the power transmitter and power receiver, including:
  - modulating the electromagnetic energy with the power transmitter;
  - demodulating the electromagnetic energy with the power receiver;
  - varying a load coupled to the second electromagnetic coil with the power receiver; and
  - detecting variations of the load coupled between the second and first electromagnetic coils with the power transmitter.

* * * * *